(12) United States Patent
de Boer et al.

(10) Patent No.: US 6,917,759 B2
(45) Date of Patent: Jul. 12, 2005

(54) SHARED MESH SIGNALING ALGORITHM AND APPARATUS

(75) Inventors: Evert E. de Boer, Nepean (CA); James A. Shields, Antrim (GB); Richard Trudel, Ile Bizard (CA)

(73) Assignee: Nortel Networks Limited, St. Laurent (CA)

( * ) Notice: Subject to any disclaimer, the term of this patent is extended or adjusted under 35 U.S.C. 154(b) by 629 days.

(21) Appl. No.: 10/059,344

(22) Filed: Jan. 31, 2002

(65) Prior Publication Data

US 2004/0208118 A1 Oct. 21, 2004

(51) Int. Cl.[7] .............................................. H04B 10/00
(52) U.S. Cl. ............................................ 398/5; 398/58
(58) Field of Search ........................... 398/4, 5, 61, 62, 398/63, 64, 58; 370/216, 217, 225, 227, 229

(56) References Cited

U.S. PATENT DOCUMENTS

| | | | | |
|---|---|---|---|---|
| 5,406,401 A | * | 4/1995 | Kremer | 398/4 |
| 5,793,745 A | | 8/1998 | Manchester | 370/224 |
| 5,914,798 A | * | 6/1999 | Liu | 398/7 |
| 5,999,286 A | * | 12/1999 | Venkatesan | 398/5 |
| 6,009,075 A | | 12/1999 | Roberts et al. | 370/219 |
| 6,073,248 A | * | 6/2000 | Doshi et al. | 714/4 |
| 6,304,346 B1 | * | 10/2001 | Sawada et al. | 398/2 |

FOREIGN PATENT DOCUMENTS

EP          1134922 A2        9/2001

* cited by examiner

Primary Examiner—Jason Chan
Assistant Examiner—Christina Y Leung
(74) Attorney, Agent, or Firm—Dowell & Dowell, P.C

(57) ABSTRACT

A shared mesh protection scheme defines an associated protection path when a working connection is established. During the protection path definition, the corresponding protection path information is sent down to a switch card of network elements making up the protection path. Upon detection of the failure, the network elements using an overhead byte message will inform the routing source network element of the failure of the connection in the working path. The overhead bytes used are interrupt driven bytes located in the line and path overhead of network traffic. The routing source node of the connection will then send the corresponding overhead byte messages down the protection path to provide for protection path establishment according to the preloaded data located at the switch card. It should be noted that each connection can have a source and termination element which relates to the source from where the corresponding connection was set-up rather than the direction of the payload transmission. Therefore, once the failure has occurred the source elements will send messages using overhead bytes to the corresponding network elements along the protection path. Accordingly, routing tables located at the switch card of the network elements, set-up when the working path connections were initially established, determine this dynamically allocated protection path environment.

50 Claims, 10 Drawing Sheets

SHARED MESH SIGNALING ALGORITHM AND APPARATUS

The present invention relates to optical communication systems and, in particular, to apparatus and methods for providing protection signaling between network elements.

BACKGROUND OF THE INVENTION

Optical communication systems have become widely implemented in todays telecommunication networks. The Synchronous Optical Network (SONET) is a standard for Synchronous Telecommunication Signals used for optical transmission based on the synchronous digital hierarchy (SDH). SONET can provide the ability to combine and consolidate traffic through grooming, and can reduce the amount of back to back multiplexing in providing transport services for ATM, SMDS, and Frame Relay, etc. Furthermore, network providers can use SONET network features to reduce the operation costs of the transmission network.

The network standards are ANSI T1.105 for SDH and Bellcore GR-253-CORE for SONET, which define the physical interface and optical line rate known as the optical carrier (OC) signals, a frame format, and an OAM Protocol. In operation of the SONET system, user signals are converted into a standard electrical format called the Synchronous Transport Signal (STS), which is the equivalent of the optical signal. A single optical channel operates and transmits data according to a high speed synchronous digital hierarchy standards, such as the SONET OC-3, OC-12, and OC-48 rate protocols, which carry rates equivalent to tens of thousands of voice calls. Accordingly, it is critical in todays optical communication systems to provide and maintain the integrity of data communication networks even during problem time periods, due to the large number of transmissions that can be interrupted.

The increased capacity of optical fibre has raised concerns about the reliability and survivability of an optical network, since a single cable cut or equivalent malfunction can impact a large amount of data traffic. Cable cuts can be frequent and almost impossible to avoid, caused by human error or inclement weather. Furthermore, equipment failures resulting from man made or natural disasters are additional possibilities. Accordingly, optimized protection signaling systems and methods are desired in order to quickly re-establish network communications once failures have been detected.

Two types of failures can be experienced in a telecommunication network, such as line failures and module failures. The basic telecommunication network structure consists of various links situated between corresponding transmitters and receivers, which are also referred to as modules. Accordingly, a line failure can include damage to the physical fibre and optical components, such as the malfunction of amplification equipment situated along the optical data path. In contrast, the module failure can consist of the transmission or reception equipment, such as a laser diode transmitter. It should be noted that both line failures and module failures may disable the link between two nodes. It is therefore required in todays telecommunication network systems to provide restoration techniques to restore the interrupted traffic temporarily until the detected failure is repaired. One such protection system currently in use is line protection.

One known line protection system is Bi-direction Line Switched Ring systems (BLSR), which have the advantage of relatively fast speed protection circuitry. These ring systems consist of a plurality of nodes coupled in a ring by two multiplexed communication paths, which provide data transmission in opposite directions around the ring. In the presence of a fault such as a fibre cut, the BLSR system detects the presence of this failure in the two nodes immediately adjacent the fault and the communications are maintained via both paths forming the closed loop. The communication signals are therefore transmitted along the two paths from the two nodes adjacent to the fault. The BLSRs are currently used in Backbone networks and are therefore built for higher data transfer rates such as the OC-12/48. Further BLSR protection systems can include 4F and 2F implementations.

One disadvantage with BLSR systems is that they can not be easily applied to already existing (synchronous or asynchronous) communication systems without requiring costly equipment upgrades, for example a change in wavelength or bit rate involves a change in equipment. In addition, BLSR systems have disadvantages in that they do not provide for 1:N protection (i.e. protection of N working channels using one protection channel) since path deployment is typically designated as 50% working and 50% protection, however as BLSR does not support Timeslot Interchange (TSI), the actual efficiency of the working bandwidth is about three quarters of the designated 50% deployment. Furthermore, BLSR systems can have an additional limitation that all nodes around the ring must be of the same type and must have the same capacity.

One technique that has been tried in order to remove the problems of the BLSR design is a mesh protection design. In a full mesh design, each network element within a network is coupled to every other network element. On a partial mesh design, less optical carrier links are utilized. Well known mesh techniques have an advantage in terms of minimising the requirements for dedicated protection path bandwidth, since the optical bandwidth used for protection is only assigned to a protection path during a failure situation, hence reducing the cost of additional fibre and providing greater network flexibility. However, one key problem with these well known mesh designs is the amount of time that is required to locate and establish the protection path and a subsequent new working path after a failure occurs. The time it takes to re-establish communications after failure is critical since the time period during protection switching and protection path establishment should be small enough so as to unnoticable the devices or people using the data traffic. These systems typically use the control layer of the network to assist in protection switching, which can provide undesirable protection switching times on the order of seconds. Accordingly, alternative protection signaling systems and methods are desired to potentially reduce the switching times by an order of magnitude.

A further solution to address the desirability of fast protection times is to provide switching at the line level between adjacent network elements. This type of system could probably provide times in the 50 msec range, however would require protection bandwidth to be made available between every network element which would add to the complexity of the network architecture. Another solution could be to use the signaling network to do the switching, which could provide flexibility of sharing bandwidth between adjacent network elements. However, this method of using the signaling network has a disadvantage due to the processing of network overhead, whereby desirable protection times of less than 300 msec may not be achievable consistently. Accordingly, alternative protection signaling systems and methods are desired to reduce switching times, without substantially increasing network architecture and/or overhead processing.

It is an object of the present invention to provide a protection signaling system in a shared mesh environment to obviate or mitigate some of the above-presented disadvantages.

SUMMARY OF THE INVENTION

The present invention is directed to a shared mesh protection scheme for defining an associated protection path when a working connection is established. The shared protection path is used for data traffic in the event a network failure is detected. During the protection path definition, the corresponding protection path information is sent down a switch card of network elements making up the protection path. Upon detection of the failure, the network elements using overhead byte messages will inform the routing source network element of the failure in the working path. The routing source network element of the connection will then send corresponding overhead byte messages down the protection path to provide for protection path establishment according to preloaded data located at the switch card of the affected network elements. It should be noted that each connection can have a source and termination network element which relates to the source from where the corresponding connection was set-up rather than the direction of the payload transmission. Therefore, once the failure has occurred the source network elements will send messages using overhead bytes to the corresponding network elements along the protection path. Accordingly, routing tables located at the switch cards of the network elements, set-up when the working path connections were initially established, determine this dynamically allocated protection path environment. Therefore, based on the information contained in these tables, the actual protection path is established upon receiving the ACK from the termination node of the failed working path transmitted along the now established protection path. It is noted that interrupt driven overhead bytes for network traffic are used to provide for protection times of less than 300 msec.

According to the present invention there is provided a controller for providing a 1:N shared mesh protection system to define a protection path associated with N working paths, the controller comprising a first link for connecting the controller to a control layer of the network to monitor network traffic communicated in a path layer of the network; a second link for connecting the controller to the path layer of the network, the path layer including a plurality of interconnected network elements for providing the associated protection path and working paths; a connection table accessible by the controller, the connection table for having connection information of the network elements associated with the protection path and the working paths, the connection information including a first identity assignable to the protection path and a distinctive second identity assignable to each of the working paths; and a failure indicator for providing the first identity and the second identity relatable to a network failure of the corresponding working path to at least one of the network elements associated with the controller, the failure indicator for insertion into an interrupt driven overhead byte of the network traffic for communication between the network elements, wherein the failure indicator is communicated in the overhead byte of the network traffic to provide for the establishment of the associated protection path after the network failure has been detected in the corresponding working path.

According to a further aspect of the present invention there is provided a 1:N shared mesh protection system to define a protection path associated with N working paths, the method comprising the steps of interconnecting a plurality of network elements for providing the protection path and the working paths in a path layer of the network; monitoring by a control layer the network traffic communicated in the path layer; defining a connection table accessible by the control layer for containing connection information of the network elements associated with the protection path and working paths, the connection information including a first identity assigned to the protection path and a distinctive second identity assigned to each of the working paths; providing a failure indicator having the first identity and the second identity related to a detected network failure of the corresponding working path to at least one of the network elements; and inserting the failure indicator into an interrupt driven overhead byte of the network traffic for communication between the network elements, wherein the failure indicator is communicated in the overhead byte of the network traffic to provide for the establishment of the associated protection path after the network failure has been detected in the corresponding working path.

According to a still further aspect of the present invention there is provided a computer program product for providing a 1:N shared mesh protection system to define a protection path associated with N working paths, the product comprising a computer readable medium; a first link module stored on the computer readable medium for connecting a controller to a control layer of the network to monitor network traffic communicated in a path layer of the network; a second link module coupled to the first link layer module for connecting the controller to the path layer of the network, the path layer including a plurality of interconnected network elements for providing the associated protection path and working paths; a connection table module coupled to the first link module accessible by the controller, the connection table module for having connection information of the network elements associated with the protection path and the working paths, the connection information including a first identity assignable to the protection path and a distinctive second identity assignable to each of the working paths; and a failure indicator module coupled to the connection table module for providing the first identity and the second identity relatable to a network failure of the corresponding working path to at least one of the network elements associated with the controller, the failure indicator module for inserting a failure message into an interrupt driven overhead byte of the network traffic for communication between the network elements, wherein the failure message is communicated in the overhead byte of the network traffic to provide for the establishment of the associated protection path after the network failure has been detected in the corresponding working path.

According to a still further aspect of the present invention there is provided a network failure in an optical mesh network, the network having a 1:N shared mesh protection system to define a protection path associated with N working paths, the network element comprising a link for connecting the network element to a path layer of the network, the path layer including a plurality of interconnected elements for providing the associated protection path and working paths; a routing table accessible by the network element, the routing table having routing information associated with the protection path and the working path; a first identity assignable to the protection path and a distinctive second identity assignable to each of the working paths, the identities associated with the routing information; and a failure indicator for providing the first identity and the second identity relatable to a network failure of the corresponding working path to at least one of the interconnected elements, the failure indicator for insertion into an interrupt driven overhead byte of network traffic transmitted over the mesh network for communication between the interconnected elements, wherein the failure indicator is communicated in the overhead byte of the network traffic to help initiate the establishment of the associated protection path after the network failure has been detected in the corresponding working path.

BRIEF DESCRIPTION OF THE DRAWINGS

These and other features of the preferred embodiments of the invention will become more apparent in the following detailed description in which reference is made to the appended drawings wherein:

FIG. 3b shows further detail of the frame format of FIG. 3a;

FIG. 4b shows connection maps for the subnetwork of FIG. 4a;

FIG. 4c shows routing maps of the protection signaling scheme for the subnetwork of FIG. 4a;

FIG. 5 shows a failure mode for an alternative embodiment of the subnetwork of FIG. 4a;

FIG. 6 is an operational flowchart of the subnetwork of FIG. 4a; and

FIG. 7 is a further operational flowchart of the subnetwork of FIG. 4a.

DESCRIPTION OF THE PREFERRED EMBODIMENTS

Figure 1:
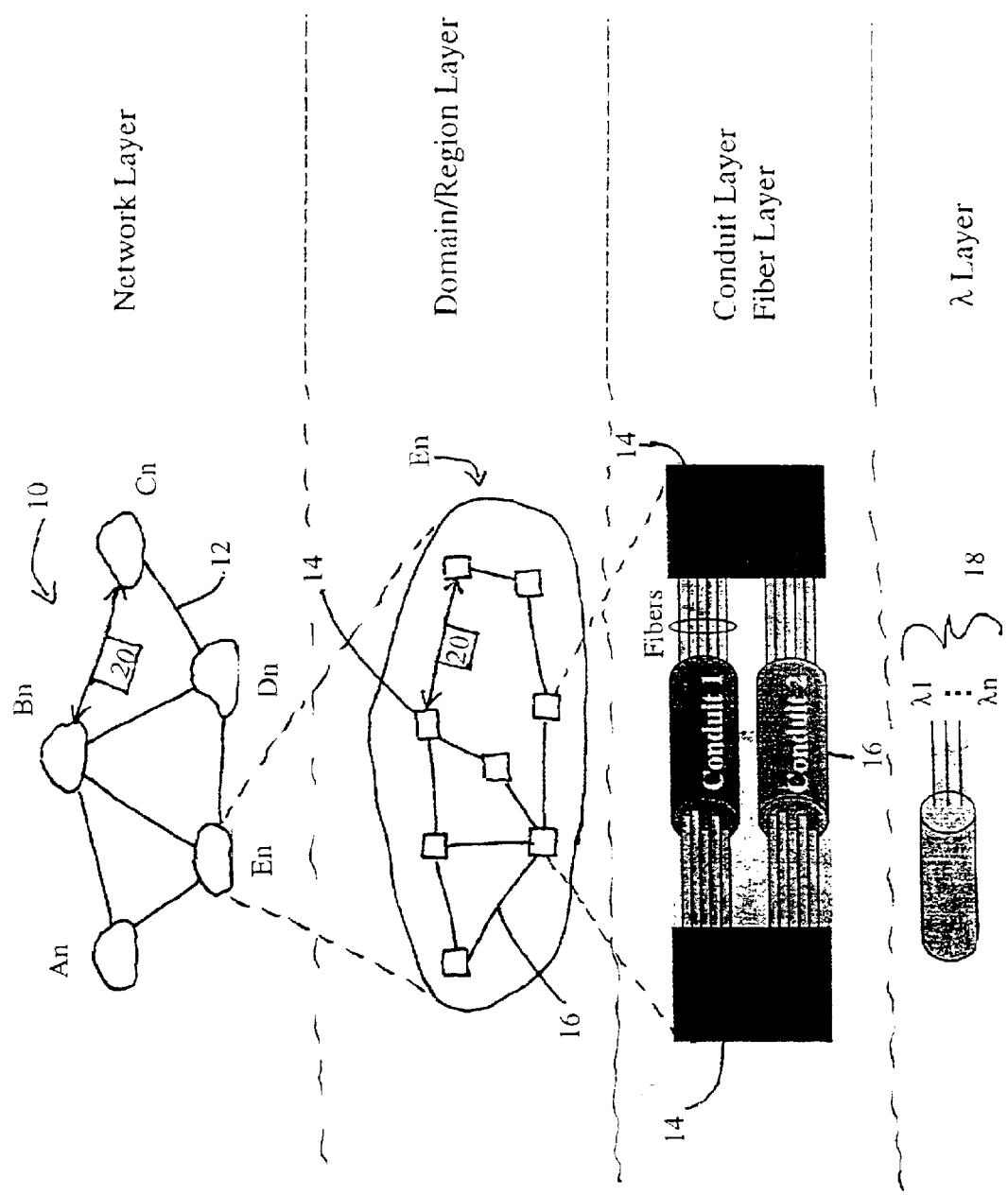
FIG. 1 is a diagram of a data communication network.

Referring to FIG. 1, a global telecommunication network 10 contains a series of sub-networks An, Bn, Cn, Dn, En interconnected by bulk data transmission mediums 12. These mediums 12 can consist of such as but not limited to optical fibre, wireless, and copper lines which are collectively referred to as the Backbone Network. Each sub-network An, Bn, Cn, Dn, En contains a plurality of network elements 14 interconnected by conduits 16, which can be collectively referred to as path layer 17 (see FIG. 2). These conduits 16 can consist of fibre optic cables, DSL (Digital Subscriber Loop), cable, and wireless mediums, wherein each conduit 16 can be capable of providing the transmission of multiple wavelengths 18 as required by the telecommunication network 10. The transmission structure of the telecommunication network 10 can be used by a variety of different carriers, such as ILECs, CLECs, ISPs, and other large enterprises to monitor and transmit a diverse mixture of data packets 20 in various formats. These formats can include voice, video, and data content transferred over the individual SONET, SDH, IP, WDN, ATM, and Ethernet networks associated with the telecommunication network 10.

Figure 2:
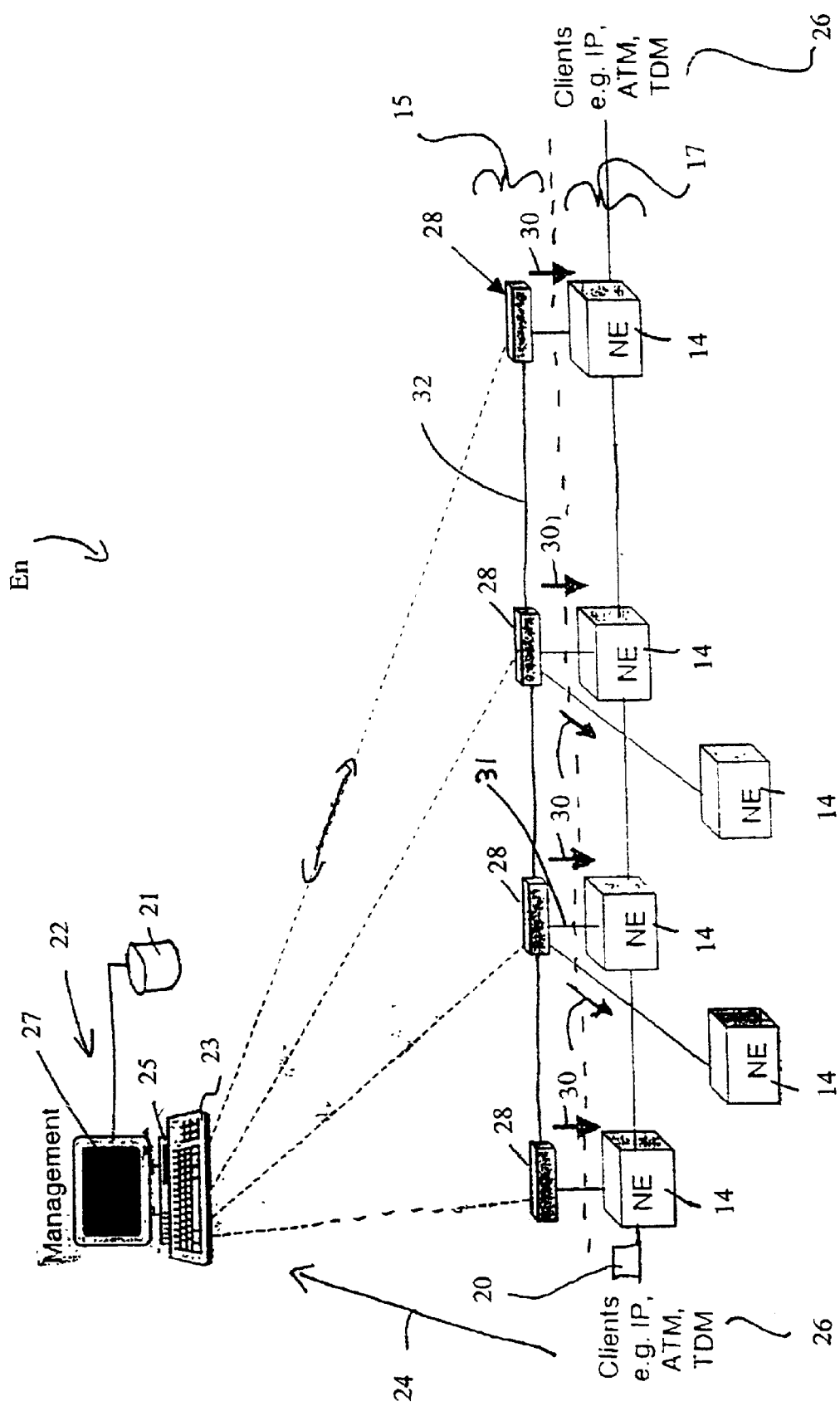
FIG. 2 is a sub-network of the network of FIG. 1.

Referring to FIG. 2, operation of each network element 14 can be monitored by a central integrated management or Operations Support System (OSS), which for example co-ordinates a plurality of connection requirements 24 received from clients 26 connected to the sub-network E. Alternatively, these connection requirements 24 can also be communicated direct to a corresponding Optical Connection Controller (OCC) 28. The system 22 can include a processor 25. The processor 25 is coupled to a display 27 and to user input devices 23, such as a keyboard, mouse, or other suitable devices. If the display 27 is touch sensitive, then the display 27 itself can be employed as the user input device 23. A computer readable storage medium 21 is coupled to the processor 25 for providing instructions to the processor 25 to instruct and/or configure the various OCCs 28, and corresponding coupled network elements 14, to perform steps or algorithms related to the operation of a shared protection class of service with protection signaling implemented on the subnetwork En. The computer readable medium 21 can include hardware and/or software such as, by way of example only, magnetic disks, magnetic tape, optically readable medium such as CD ROM's, and semiconductor memory such as PCMCIA cards. In each case, the medium 21 may take the form of a portable item such as a small disk, floppy diskette, cassette, or it may take the form of a relatively large or immobile item such as hard disk drive, solid state memory card, or RAM provided in the support system OSS. It should be noted that the above listed example mediums 21 can be used either alone or in combination. Accordingly, the shared mesh protection scheme with protection signaling, as further defined below, can be implemented on the subnetwork En in regard to the co-ordination of the plurality of connection requirements 24 submitted by the clients 26, as well as monitoring the timely transmission of the data packets 20.

The clients 26 or other peripheral devices can include such as but not limited to hubs, leased lines, IP, ATM, TDM, PBX, and Framed Relay PVC. Coupled to each network element 14 BY LINK 31 is the OCC 28, which co-ordinates a connection and data request 30 to each of their corresponding network elements 14. This association of OCCs 28 is also referred to as a control layer 15 with each OCC 28 coupled together by links 32, which has a complete picture of their corresponding element 14 interconnections.

Figure 3A:
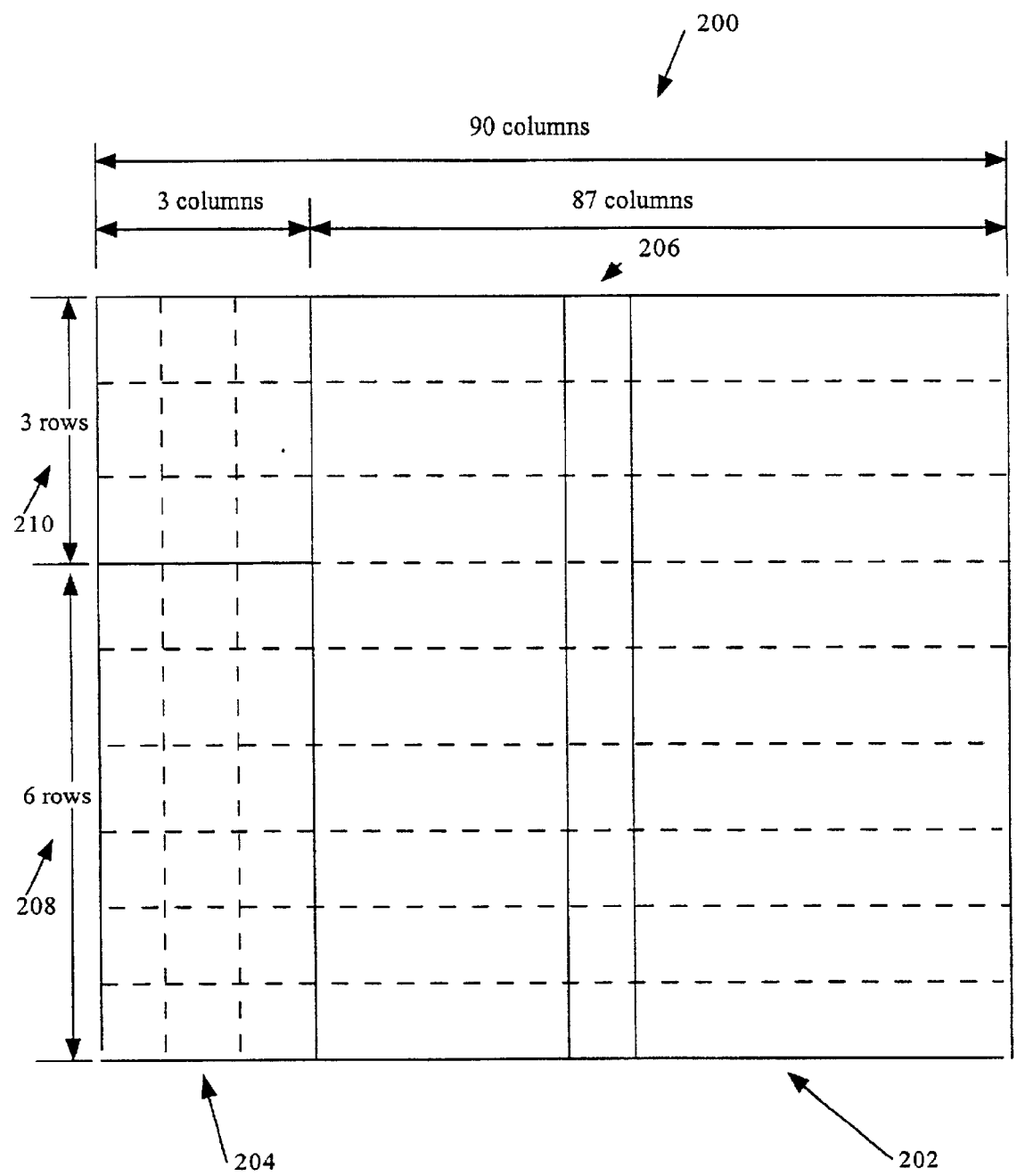
FIG. 3a shows an STS-1 frame format.

Referring to FIGS. 2 and 3a, the shared protection class of service is implemented on the sub-network E to provide a protection signaling scheme for use in mesh networks, as further given by example below. It is preferable that the protection signaling scheme be able to provide protection or restoration times of less than 200 msec for a large number of network connections consisting of coupled network elements 14 and OCCs 28, as further described by example only. The signal transmission and reception of data packets 20 over the subnetwork En can be performed using the Synchronous Transport Signal (STS) frame format 200 (see FIG. 3a), which is a basic building block of a SONET optical interface. The STS-1 (level 1) is the basic signal rate of SONET and multiple STS-1 frames 200 may be concatenated to form STS-N frames 200, where the individual STS-1 signals are byte interleaved. Referring to FIG. 3a, the STS-1 frame 200 comprises two parts, the STS payload 202 having 87 columns by 9 rows for a total of 783 bytes, and the STS transport header or overhead 204, having 3 columns by 9 rows for a total of 27 bytes. It should be noted the payload 202 can also contain a path overhead 206 having 1 column by 9 rows for a total of 9 bytes. The STS payload 202 carries the information portion of the STS-1 frame 200, while the STS transport overhead 204 carries the signaling and protocol information. This allows communication between network elements 14 within the subnetwork En, facilitating administration, surveillance, provisioning, and control of the subnetwork En from a central location. At the ends of the subnetwork En, such as the clients 26, the data packets 20 with various rates and different formats are dealt with. A SONET end-to-end connection includes terminating equipment at both ends, responsible for converting the data packets 20 from the user format to the STS format prior to transmission through the SONET subnetwork En, and for converting the data packets 20 from STS format back to the user format once transmission is complete.

SONET networks contain a four layer system hierarchy, with each layer building on the services provided by the lower layers. Each layer communicates to peer equipment in the same layer, processes information and passes it up and down to the next layer. Referring to FIGS. 2 and 3a, the path layer 17 helps to provide the end-to-end transport of data packets 20 converted to STS-1 payload 202 at the appropriate signaling speed, mapping services (such as DS1, DS2, DS3 and video), and path overhead 206 into Synchronous Payload Envelopes (SPEs) of the STS-1 frame 200. The control layer 15 helps to multiplex and synchronize the SPEs and can adds line overhead 208 of the transport overhead 204 to form STS-N combined signal frames 200. The section layer (not shown) can perform scrambling and framing, and can add section overhead 210, in order to create the STS-1 frames 200. Finally, the photonic layer (not shown) is the SONET physical layer, converting electrical signals into optical STS-1frames 200 and transmitting these to distant network elements 14. At the distant network elements 14 the process is reversed, starting with the photonic layer, whereby the optical STS-1 frames 200 are converted to the electrical data packets 20 and passed down through the path layer 17 where the different service signals terminate. Further, the optical form of the STS-1 signals are called Optical Carriers (OCs), wherein, the STS-1 signal and the OC-1 signal are designed to have the same rate.

It is recognized that higher rate STS-1 frames 200 can be obtained by byte interleaving N frame aligned STS-1 frames 200 to form an STS-N frame 200 in accordance with conventional SONET technology. An STS-N frame 200 may be viewed as having a repetitive frame structure, wherein each frame 200 comprises the transport overhead bytes 204 of N STS-1 frames 200 and N synchronous payload envelopes 202. For example, three STS-1 signals may be multiplexed by a multiplexer into an STS-3 signal. The bit rate of the STS-3 signal is three times the bit rate of an STS-1 signal and the structure of each frame of the STS-3 signal comprises three synchronous payload envelopes 202 and three fields of overhead bytes 208 from the three original STS-1 signals. When transmitted using optical fibres, the STS-N signal is converted to optical form and is designated as the OC-N signal. Furthermore, the protection paths (see below) can also be OC3c up to OC192c as long as the infrastructure of the subnetwork En supports concatenated payloads 202.

Figure 3B:
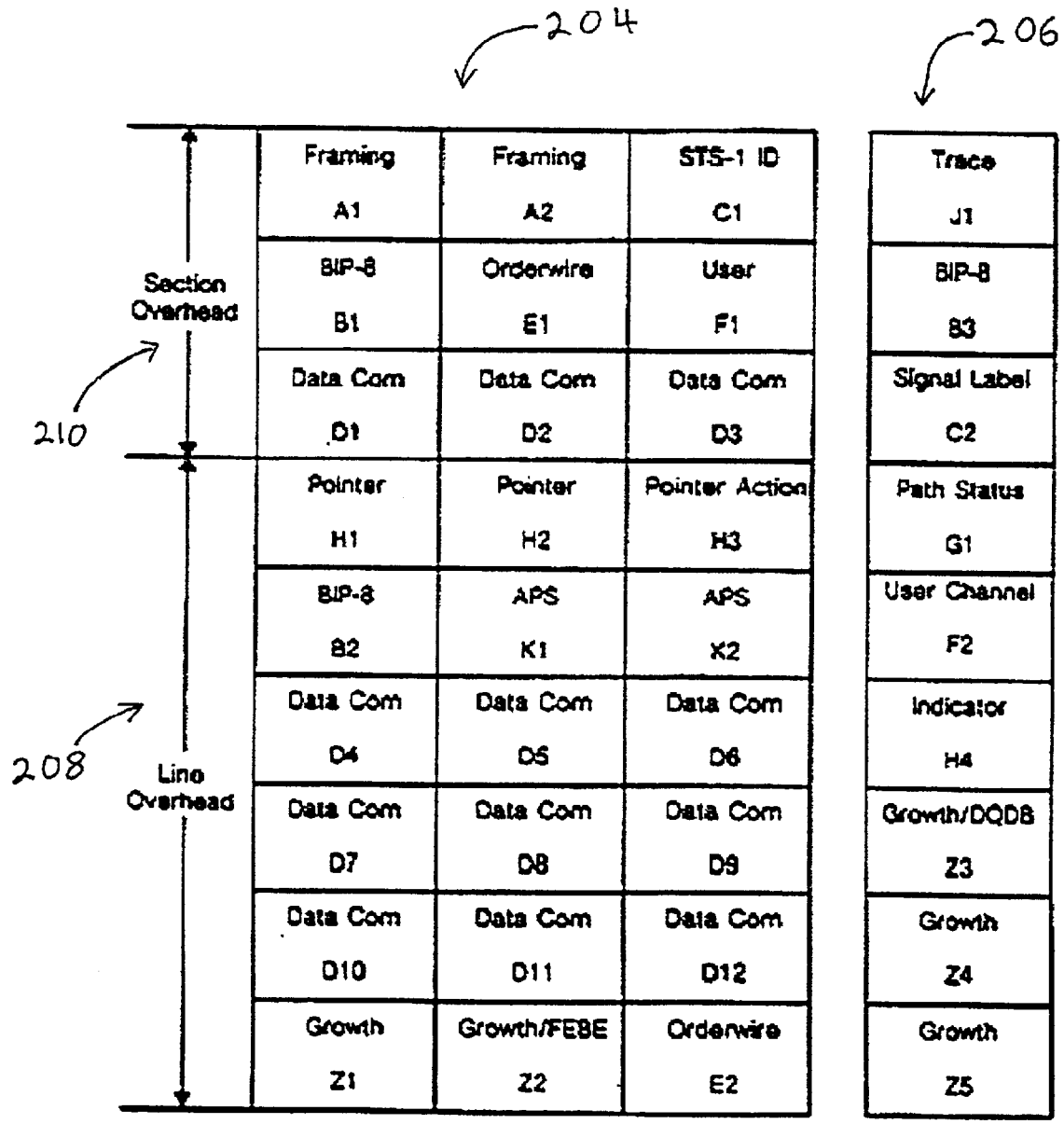

Referring to FIG. 3b, the transport overhead 204 and path overhead 206 for the STS-1 frame 200 of FIG. 3a are described in greater detail below. As noted above, the overhead bytes contained in the overheads 204, 206 are distributed in 4 columns, each consisting of 9 rows. As will be further described below, selected bytes of these overheads 204, 206 are employed for failure identification and protection switching for the described shared mesh protection scheme of the present invention.

The section overhead 210 of the transport overhead 204 contains framing A1 and A2 bytes, which are dedicated to each STS-1 to indicate the beginning of the STS-1 frame 200. The A1, A2 bytes pattern is F628 hex (this F628 is never scrambled). When 4 consecutive errored framing patterns have been received, an OOF (Out Of Frame) condition is declared. When 2 consecutive error free framing patterns have been received, an in frame condition is declared. The section overhead 210 also contains a STS-ID C1 byte, which is a number assigned to each STS-1 signal in the STS-N frame in according to the order of its appearance, ie the C1 byte of the first STS-1 signal in the STS-N frame is set to 1, the second STS-1 signal is 2 and so on. The C1 byte is assigned prior to byte interleaving and stays with the STS-1 until deinterleaving. A section BIP-8 B1 byte is allocated from the first STS-1 of the STS-N for section error monitoring. The B1 byte is calculated over all bits of the previous STS-N frame 200 after scrambling using a bit interleaving parity 8 code with even parity. The B1 byte of the current STS-N frame 200 is calculated and compared with the B1 byte received from the first STS-1 of the next STS-N frame 200. If the B1 bytes match, there is no error. If the B1 bytes do not match and the threshold is reached, then an alarm indicator is set. An orderwire E1 byte is allocated from the first STS-1 of the STS-N frame 200 as local orderwire channel for voice channel communications. Accordingly, one byte of the STS-1 frame 200 is 8 bits/125 usec or 64 Kbps which is the same rate as a voice frequency signal. A user F1 byte is set for the user purposes, and is passed from one section level to another and terminated. A plurality of data communication D1, D2 and D3 bytes are allocated from the first STS-1 of the STS-N frame. This 192 kpbs message channel of the D1, D2, D3 bytes can be used for alarms, maintenance, control, monitoring, administration and communication needs.

The line overhead 208 of the transport overhead 204 contains Pointer H1 and H2 bytes, which in each of the STS-1 signals of the STS-N frame 200 is used to indicate an offset in the bytes between a pointer and the first byte of the STS-1 SPE. The pointer is used to align the STS-1 SPE in an STS-N signal as well as to perform frequency justification. The first pointer H1 byte contains the actual pointer to the SPE, the following pointer H2 byte contains the linking indicator which is 10010011 11111111. The Pointer Action H3 byte in each of the STS-1 signals of the STS-N frame 200 is used for frequency justification purpose. Depending on the pointer value, the H3 byte is used to adjust the fill input buffers. The H3 byte only carries valid information, but it is not defined for negative justification. The BIP-8 B2 byte in each of the STS-1 signal of the STS-N frame 200 is used for line error monitoring function. Similar to the B1 byte in the section overhead 210, but the B2 byte uses bit interleaving parity 8 code with even parity. The byte B2 contains the result from the calculation of all the bits of line overhead 208 and the STS-1 payload envelope 202 capacity of the previous STS-1 frame 200 before scrambling. The Automatic Protection Switching (APS) K1 and K2 bytes are allocated for APS signaling between line level entities for line level bi-directional APS. These bytes K1, K2 are defined only for STS-1 number 1 of the STS-N signal frame 200. The Data Communication D4–D12 bytes are allocated for line data communication and should be considered as one 576-kbps message-based channel that can be used for alarms, maintenance, control, monitoring, administration, and communication needs between two section terminating network elements 14. The D4–D12 bytes of the rest of the STS-N frame 200 are not typically defined. The Growth/FEBE Z1 and Z2 bytes are set aside for functions not yet defined. The Orderwire E2 byte is allocated for orderwire between line entities. This E2 byte is defined only for STS-1 number 1 of the STS-N signal frame 200.

The path overhead 206 of the payload 202 envelope is assigned to and transported with the payload 202. The path overhead 206 is created by the PTE as part of the SPE until the payload envelope 202 is demultiplexed at the terminating path network elements 14. The path overhead 206 supports the following four classes of operation: Class A payload independent functions required by all payload type, Class B mapping dependent functions not required by all payload type, Class C application specific functions, and Class D undefined functions reserved for future use. Accordingly, the Trace J1 byte, class A, is used by the receiving network element 14 to verify the path connection in the subnetwork En. The BIP-8 B3 byte, class A, is assigned for path error monitoring. The path B3 byte is calculated over all bits of the previous STS SPE before scrambling using bit interleaved parity 8 code with even parity. The Signal Label C2 byte, class A, is assigned to indicate the construction of the STS SPE. The following hex values of the C2 byte has been defined as 0x00— Unequipped signal, 0x01—Equipped signal, 0x02— Floating VT mode, 0x03—Locked VT mode, 0x04— Asynchronous mapping for DS3, 0x12—Asynchronous mapping for 139.264 Mbps, 0x13—Mapping for ATM, 0x14—Mapping for DQDB, and 0x15—Asynchronous mapping for FDDI. The Path Status G1 byte, class A, is assigned to carry back an originating STS PTE of the path terminating status and performance. This allows a complete duplex path to be monitored at either end. The User Channel F2 byte, class C, is allocated for user communications between network elements 14. The Indicator H4 byte, class C, provides a generalized multiframe indicator for the payload 202. The Growth 3 bytes, Z3–Z5, are class D and are reserved for future functions.

As further noted below, some of the interrupt driven (i.e. considered fast access) overhead bytes from the transport overhead 204 and/or the path overhead 206 are employed in the present invention to implement the protection signaling scheme for mesh networks. It should be noted that shared protection signaling schemes for mesh network architecture, in general, can include one conduit 16 between two corresponding network elements 14 assigned as the protection P path (see FIG. 4a) of a 1:N group, wherein the number "1" represents the group number and the letter "N" represents the particular member number of the corresponding group "1". Accordingly, the working W paths become the members of the 1:N group, when the working W path is established during set-up of the logical conduit 16 between the network elements 14. For instance, the first working W path with a shared mesh class of service will become the first member of the first 1:N protection group on a particular channel. Another working W path that wants to share this corresponding protection P path, now becomes the second member of the 1:N protection group. Accordingly, in the protection P path system shown by example in FIG. 4a for signaling between the network elements 14, to indicate which working W path needs protection, the preferred protection information to be transmitted over the subnetwork En is the number of the protection group "1" and the number of the protection member "N" contained in the 1:N number pair. For example, in a 10G line, the maximum number of protection groups can be 192, thereby indicating 192 STS1 1:N protection groups. If the protection path for example OC3c, OC12, or OC48, then the maximum number of the 1:N protection groups per channel would be less. It should be noted that Bellcore specifies the maximum number of protection members to be 14.

As mentioned above, the shared mesh protection signaling scheme of the present invention can employ, by way of example only, the overhead 208 APS bytes K1 and K2 for representing the group number "1" and member number "N". Traditionally, these K bytes are processed relatively quickly, since the network elements 14 are designed to process the K bytes as fast as possible for SONET protection purposes at the line level 17 independently of the control layer 15, i.e. interrupt driven. In the present protection signaling scheme shown in FIGS. 4a, b, c, it is desirable that the group "1" and member "N" information transferred between the network elements 14 does not exceed the capacity of the K1 and K2 byte content, wherein for a 10G line the maximum number of protection groups would be 192 and the Bellcore standard for the maximum number of protection members is 14. These values are representable by the K1 and K2 bytes, where use of the K2 byte is restricted because of the AIS indication within this byte. An example allocation for the protection signaling scheme using the K1/K2 bytes is given below, providing an indication of available bit values within the K1/K2 bytes.

| K1 bits 1–8 | K2 bits 1–5 (6–8 limited use only) | Assignment |
|---|---|---|
| 1111 1111 | 1111 1--- | Not Used |
| 1111 1111 through 1000 0000 | 1111 1101 through 0000 0100 | Reserved for future use (32,761 combinations) |
| 0111 xxxx | xxyy y--- | Switch Request; x indicates the protection group number (6 bits); y indicates the protection group member (3 bits) |
| 0110 xxxx | xxyy y--- | Acknowledgement of Switch Request; x indicates the protection group number (6 bits); y indicates the protection group member (3 bits) |
| 0101 xxxx | xxyy y--- | Negative Acknowledgement of Switch Request; x indicates the protection group number (6 bits); y indicates the protection group member (3 bits) |
| 0100 xxxx | xxyy y--- | Revert back to working request; x indicates the protection group number (6 bits); y indicates the protection group member (3 bits) |
| 0011 xxxx | xxyy y--- | Acknowledgement of Revert back to working request; x indicates the protection group number (6 bits); y indicates the protection group member (3 bits) |
| 0010 0000 | 1111 1--- | Lockout of protection |
| 0010 0000 | 1111 0--- | Forced Switch |
| 0010 0000 | 1110 1--- | Reserved for SF - High Priority |
| 0010 0000 | 1110 0--- | Reserved for SF - Low Priority |
| 0010 0000 | 1101 1--- | Reserved for SD - High Priority |
| 0010 0000 | 1101 0--- | Reserved for SD - Low Priority |
| 0010 0000 | 1100 1--- | Manual Switch |
| 0010 0000 | 1100 0--- | Wait-to-Restore |
| 0010 0000 | 1011 1--- | Reserved for Exercise |
| 0010 0000 through 0000 0000 | 1011 0--- through 0000 1--- | Reserved for future use (1045 combinations) |
| ---- ---- | ---- -111 | AIS-L |
| ---- ---- | ---- -110 | RDI-L |
| 0000 0000 | 0000 0--- | No Request (Idle) |

Accordingly, for the above example K byte values, one 10G fibre contains 192 STS1s. Therefore, the absolute maximum value in this example for the group number now referred to as "x" can never be greater than 192, i.e. there can not be more than 192 1:N protection groups on one fibre. This assumes that the 1:N groups are all of an STS1 size. If larger sizes are used for instance OC3 and larger, the number of possible 1:N groups for fibre is reduced. For example, only four OC48 1:N groups are possible on one 10G fibre. The value of the member number N in Bellcore 1:N standards is a maximum of 14, which hereafter is represented by "y". Hence the largest value for the (x,y) group, member pair can be "192, 14" requiring 8 bits for "192" representation with "14" requiring 4 bits for representation. The largest value that can be supported by the K1 and K2 bytes is: 8 bits of the K1 byte and 5 bits of the K2 byte. Bits 6 to 8 of the K2 byte are used for AIS-L and RDI-L signaling, therefore totaling 13 available bits. One available bit can also be used to indicate whether the K1/K2 bytes are sending a protection switch request verses a link failure indication. The K byte message (x, y) can also use 1 bit indicating "link failure" and the remaining 12 bits can be used to indicate the link identity. Indication of the failure can be inserted into the K1/K2 Bytes, such as but not limited to using the AIS-L. Furthermore, a couple of bits can be used for special messages (ACK, NACK, etc.). Therefore, reserving 3 bits (4 messages) for this purpose leaves 10 bits for protection path identification, which if 64 1:N protection group (6 bits) with 7 member (3 bits) each per fibre or combinations thereof. It should be noted that 2 bits can be kept in reserve which are available from the extended K byte. It is therefore recognized for suitable sized protection group and member pairs (x,y) that the K2 byte could represent the group number "y" and the K1 byte the member "y".

Figure 4A:
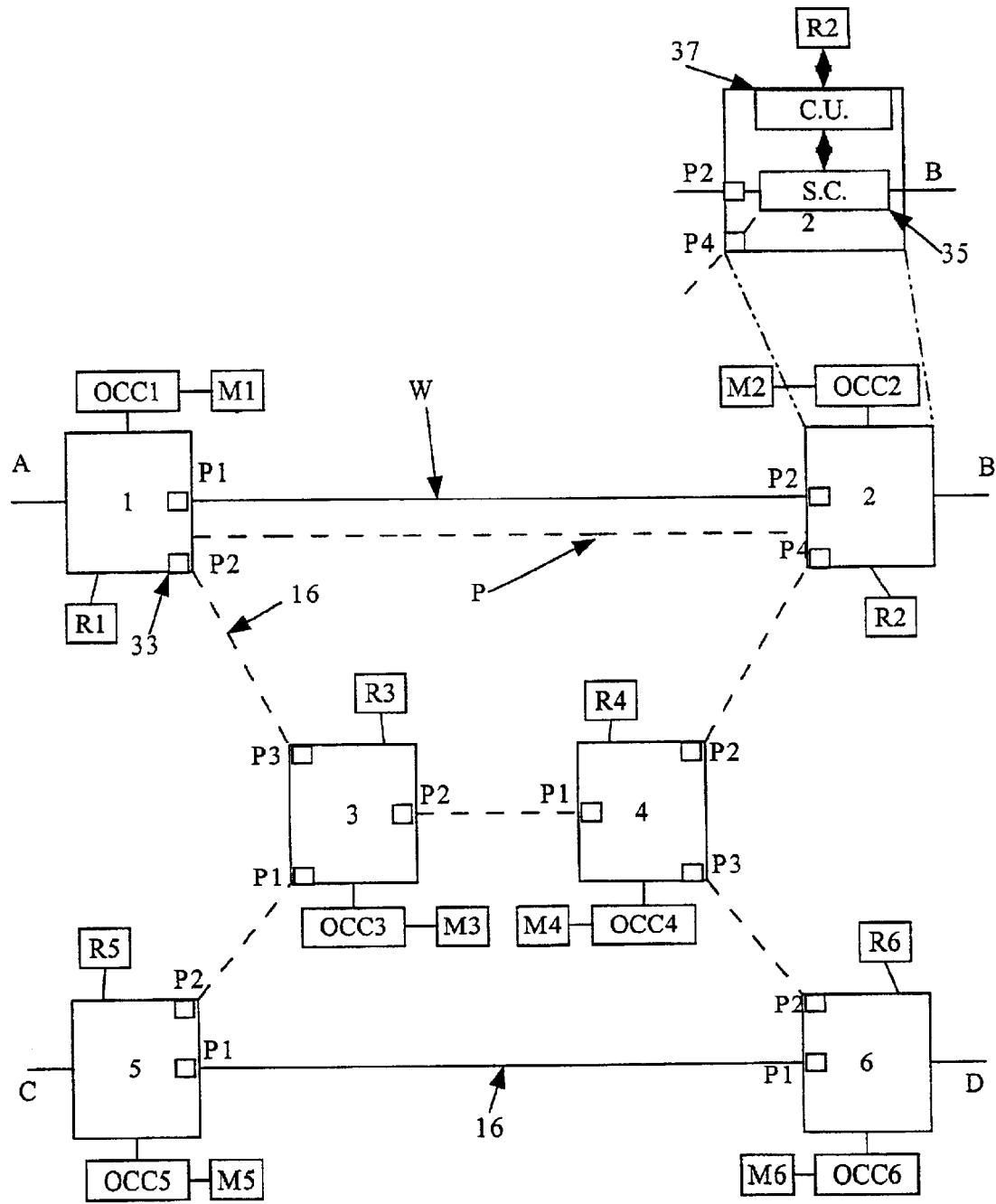
FIG. 4a is a protection signaling scheme on the subnetwork of FIG. 2.

Referring to FIG. 4a containing a simplified shared mesh network structure for clarity purposes only. The shared path protection set-up of the sub-network E consists of a series of network elements 14 indicated as 1, 2, 3, 4, 5, 6 with a corresponding number of OCC's 28 indicated as OCC 1, OCC 2, OCC 3, OCC 4, OCC 5, and OCC 6. The elements 1, 2, 3, 4, 5, 6 are interconnected by the conduits 16, logical and/or physical, with solid line paths A-B and C-D denoting working W paths and the dotted line paths 1-3-4-2 and 5-3-4-6 between the elements 1, 2, 3, 4, 5, 6 denoting potential protection P paths. The term "working" refers to the routes and equipment involved in carrying the STS-1 frames 200 on the subnetwork En during the normal mode of operation, and the term "protection" refers to the routes and equipment involved in carrying the STS-1 frames 200 on the subnetwork En during a failure mode of operation. The "normal mode of operation" refers to the operation of the subnetwork En and all conduits 16 between the elements 14 is uninterrupted and the elements 14 operate without faults. The term "failure mode of operation" refers to the operation of the subnetwork En when some of the conduits 16 between some network elements 14 are interrupted due to, such as but not limited to a cable cuts or element failures.

Figure 4B:
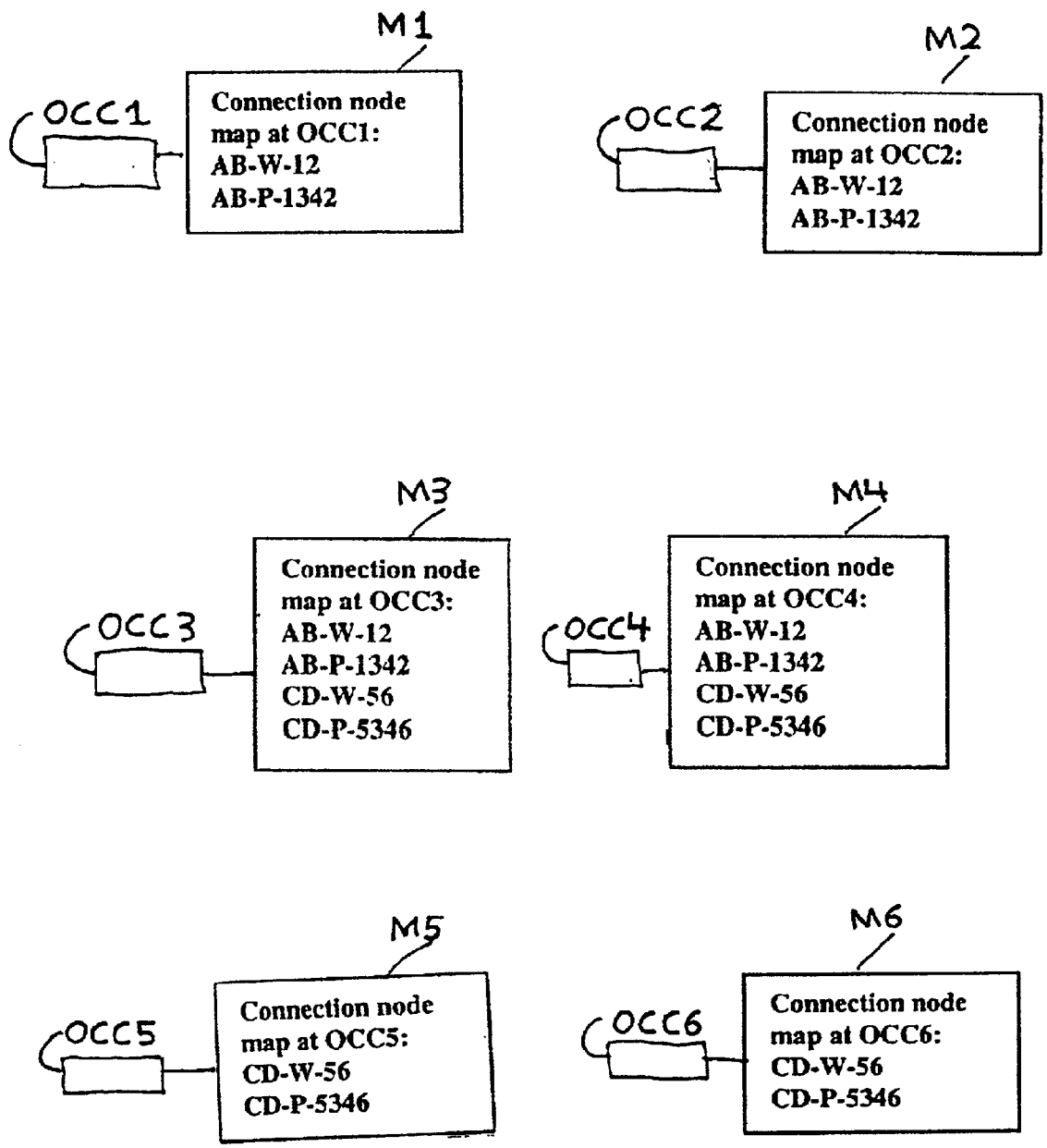

Referring to FIGS. 4a and 4b, each controller OCCn has stored a corresponding map Mn of all network elements 1, 2, 3, 4, 5, 6 used in the path containing the associated conduits 16. These connection maps Mn are indicated in FIGS. 4a, b as M1, M2, M3, M4, M5, M6, which contain connection information for all network elements 1, 2, 3, 4, 5, 6 contained in both working W and protection paths P. Referring to FIG. 4b, various example nodal maps Mn are presented that correspond to the network structure of sub-network En of FIG. 4a. For example, map M1 is stored at controller OCC1 and contains a working W path A-B between elements 1 and 2 (AB-W-12), and a protection P path for the working path A-B identified as containing network elements 1342 (AB-P-1342). Accordingly, the other nodal maps Mn for the remaining maps M2, M3, M4, M5, M6 follow a similar nomenclature for each map Mn entry. Referring to FIG. 4a, the working W paths A-B and C-D are protected via the protection P paths represented by the dotted lines. Therefore, between network elements 3 and 4 the protection P path is shared. When the protection P path of the working W path A-B is set-up, the nodal map M1 of A-B is stored at the controllers OCC3 and OCC4, since their corresponding network elements 3, 4 are contained within the protection P path for the working W path interconnection between network elements 1, 2.

After the working path W of the connection C-D has been set-up, the corresponding protection path P will need to be defined. Accordingly, at the controllers OCC3 and OCC4, the nodal maps M1 and M2 for the working path A-B will be compared by a comparison function with the nodal maps M5 and M6 corresponding to the working W path C-D. To help provide node diversity of the shared mesh protection signaling scheme, if there is no overlap of the working W or protection P paths contained in the nodal maps M1, M2, M5, M6, then the working W paths A-B and C-D can share the protection P path situated between network elements 3 and 4. On the contrary, if comparison of the nodal maps M1, M2, M5, M6 indicates that the interconnections between the corresponding network elements 1, 2, 3, 4, 5, and 6 are not diverse, then the protection P path is either assigned to another 1:N group of a corresponding port 33, or the connection is not acknowledged (NACK) to the respective source network element 1, 3, 6 for another try via a different route mapping. According, in the above sub-network En, the selection of 1:N protection P paths is now reduced to comparing a list of network elements 1, 2, 3, 4, 5, 6 in the context of a unique identification for each of the specified protection P paths. It is recognized that alternative arrangements of the example subnetwork En shown in FIG. 4a can be used to implement the above described shared protection P path setup, such as an additional working W path between network elements 3 and 4.

Figure 4C:
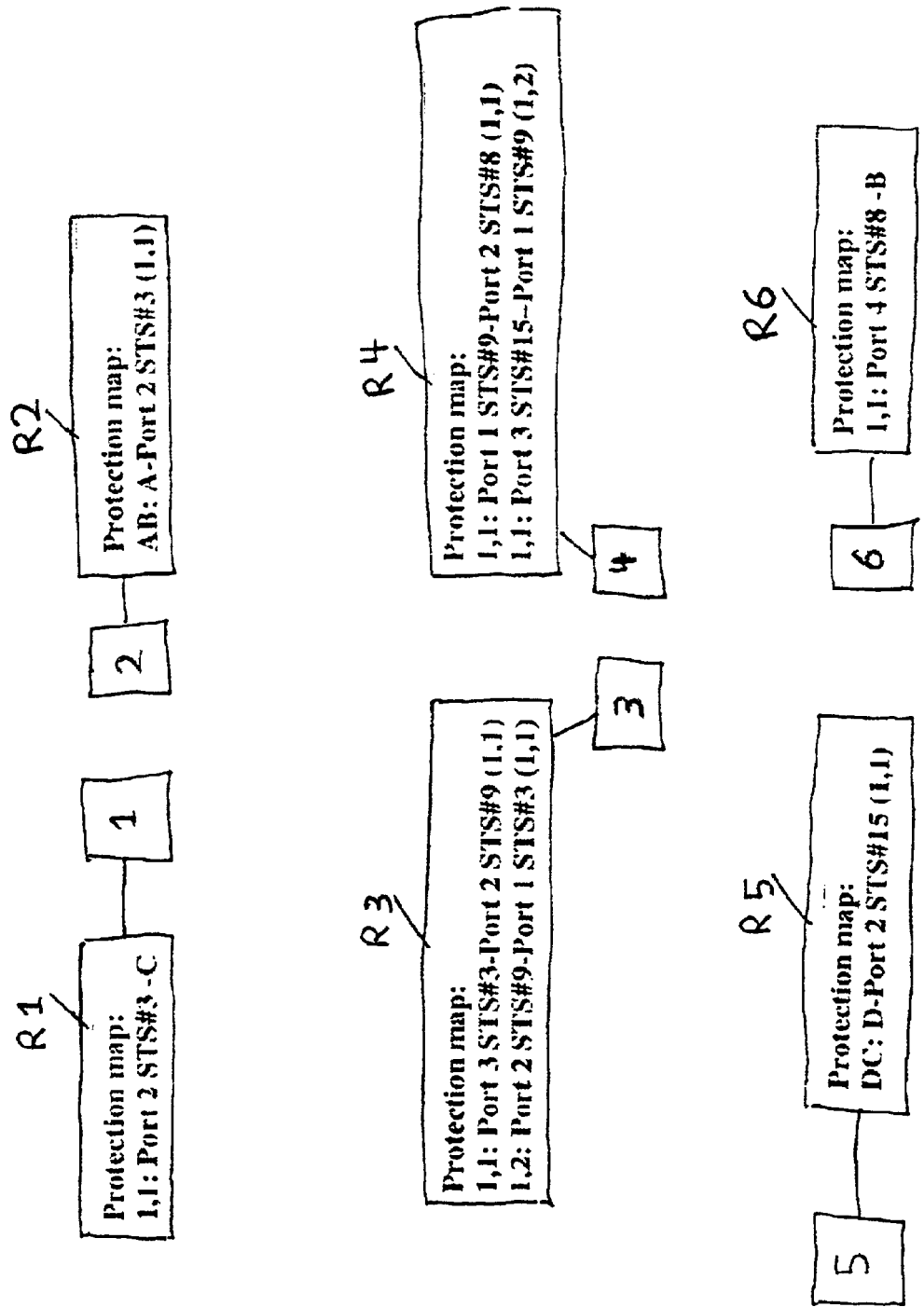

Referring again to FIG. 4a, the hardware of the network elements 1, 2, 3, 4, 5, 6 have the ports generically identified as 33 providing a coupling of the network elements 1, 2, 3, 4, 5 to the respective control/path layer 15, 17, specifically labeled respectively as P1, P2, P3, and P4 for each of the network elements 1, 2, 3, 4, 5, 6 for use in routing identification. The network elements 1, 2, 3, 4, 5, 6 also contain, as it is known in the art, switch cards 35 and control units 37, such that the switch card 35 of each network element 1, 2, 3, 4, 5, 6 is connected to the corresponding plurality of ports 33, and the network elements 1, 2, 3, 4, 5, 6 it is configured by the switch card 35 to couple the ports 33 such that STS-1 frames 200 received on one of the ports 33 is output for another of the ports 33. The control unit 37 of the network element 1, 2, 3, 4, 5, 6 is connected to the switch card 35 and monitors the adjacent network conduits 16 for a failure 34 (see FIG. 6) within the working W path. The network elements 1, 2, 3, 4, 5, 6 also have corresponding routing tables R1, R2, R3, R4, R5, R6 stored at their respective switch cards 35 with preloaded data that provides for optimized protection signaling, including a protection P path routing indicator of K byte values (x, y), for example, for insertion into the STS-1 overheads 204, 206. These routing maps R1, R2, R3, R4, R5, R6 are set-up at the connection set-up time from data supplied by the OCCs 28 when the working W paths and corresponding protection P paths are defined. It should be noted that the protection P paths are only implemented in the subnetwork En after the working W path fails. Referring to FIG. 4c, the contents of the routing or protection maps R1, R2, R3, R4, R5, R6 are shown in respect to their corresponding network elements 1, 2, 3, 4, 5, 6. Accordingly, each of the network elements 1, 2, 3, 4, 5, 6 have their respective local network structure of the overall shared protection P path scheme stored in their respective maps Rn of their switch cards 35.

Accordingly, as shown by example in FIGS. 4a and 4c, at node A the protection map R1 has an entry which reads A-B:

A-port 2 STS#3 (1,1), which means that when the failure 34 (see FIG. 6) occurs on the connection A-B, the add/drop port of A is connected to STS#3 of port P2 and the K-byte value 1,1 representing the group, member pair is sent to network element 3 Upon inspection of protection map R3, the first entry indicates that when the K-byte value 1,1 is received on port P3, then STS#3 on port P3 is connected to STS#9 on port P2 and K-byte value 1,1 is sent on port P2 towards network element 4. A second entry of the map R3 indicates when the K-byte value of 1,2 has been received at port P2, STS#9 on that port P2 must be connected to STS#3 on port P1 and the value 1,1 must be sent on port P1 towards node C. Accordingly, the entries in the other tables R2, R4, R5, and R6 can be interpreted similarly. It should be noted in the sub-network En of FIGS. 4a and 4c that the channel STS1#9 is shared on the conduit 16 between network elements 3 and 4 to protect both working W paths A-B and C-D. Accordingly, from the routing tables R1, R2, R3, R4, R5, R6 one can deduce that working W path A-B is source routed from network element 1, while working W path C-D is source routed from network element 6. Further, the protection P paths indicated by the dotted lines are built up starting at the source network elements 1, 3, 6 and the corresponding routing tables R1, R2, R3, R4, R5, R6 are set-up accordingly.

It should be noted for each generic port 33 there is a protection routing table Rn for the 1:N traffic carried on that port 33. This measure can reduce the number of look-ups required, since only the protection routing table Rn for that port 33 is searched for the appropriate entry. Furthermore, the add/drop ports are indicated by references A, B, C, and D for simplicity. In addition, the switch cards 35 of the network elements 1, 2, 3, 4, 5, 6 are set-up from the source network elements 1, 3, 6 of the corresponding conduit 16. It is noted that detailed design of particular protection routing data in the tables Rn is dependent upon the particular messaging scheme selected and implemented. Furthermore, the use of K1 and K2 bytes for providing desired switching times preferably less than 200 msec is done by way of example only, wherein other suitable overhead bytes in the transport overhead 204 and path overhead 206 could also be used, if desired. Preferably, the overhead bytes selected should be interrupt driven, as to help optimize the resultant switching times. It is further recognized that the preferable less than 200 msec overall protection switching time is with reference to an example 200 network element 14 subnetwork En with 3000 Km of conduct 16 in both the working W path and protection P path. Accordingly, other desirable switching times can be more or less than the 200 msec reference given, based on the corresponding size of the subnetwork En.

Figure 5:
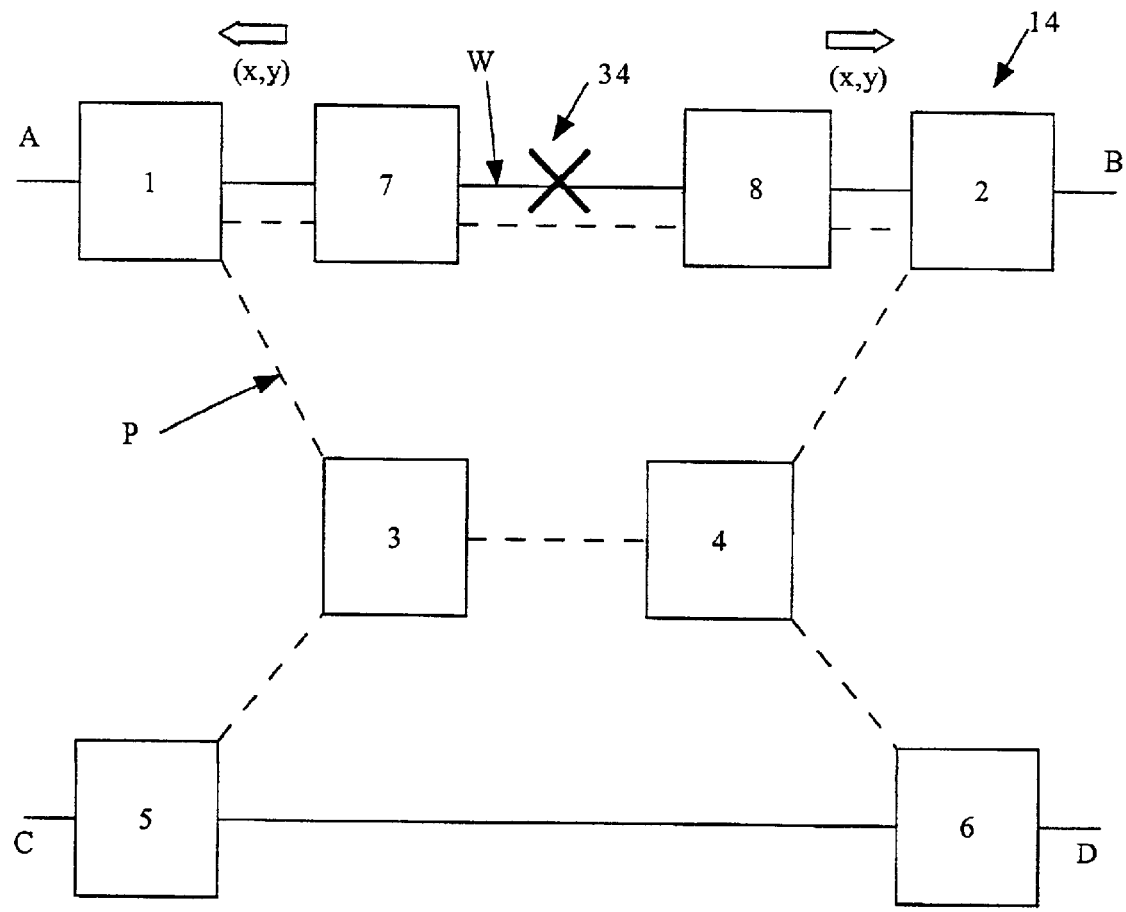

Referring to FIG. 5, an alternative embodiment of subnetwork En with interconnected network elements 1, 2, 3, 4, 5, 6, 7 has experienced the line failure 34 between network elements 7 and 8, which is subsequently detected by network elements 7 and 8. Since only line layer failures 34 are detected in the shown subnetwork En, not path layer failures, the line layer failure 34 in the subnetwork En must be communicated to the source network elements 1, 6. This is because path switching is done in the subnetwork En and protection switching is therefore initiated from the various source network elements 1, 6. However, one exception is 1+1 path switching which monitors path layer failures.

Referring again to FIG. 5, the control units 37 (see FIG. 4a) of the network elements 7, 8 monitor for the failure 34 within the working W path A-B. Accordingly, once the failure 34 is detected by the SONET layer, the corresponding control unit 37 of the affected network elements 7, 8 further operates to determine protective switching data corresponding to the failure 34 and to insert the protection switching contained in data Rn within the overhead 204, 206 of the STS-1 frame 200, such as but not limited to using AIS-L for insertion. This data Rn is then output from the corresponding ports 33 (see FIG. 4a) of the affected network elements 7, 8. Accordingly, to facilitate the indication of the line failure 34 to the source elements 1, 6, the associated conduits 16 leading back to the source elements 1, 6 are flooded using the K byte value (x, y). The source network element(s) 1, 6 protecting the working W path A-B will use the K bytes value (x, y) in the STS-1 overhead 204, 206 to indicated the line failure 34 along the defined protection P path and to provide the identity of the path A-B that failed, thereby causing the protection P path 1-3-4-2 to be set-up through reconfiguration of the switch cards 35 of the corresponding network elements 1, 3, 4, 2 in the desired protection P path. It should be noted in the above example that affected network element 7 obtains the K-byte value (x, y) from the corresponding table Rn and inserts the K-byte value (x, y) into the overhead 204, 206 K1/K2 bytes, for eventual reception by the source network element 1, thereby reporting the identified failure 34. Accordingly, the K-byte value (x, y) is inserted in the overhead 204, 206, and the opposite direction of where the failure 34 occurred for eventual reception by the source network element 1. The failure indication is transmitted in conduits 16 that are included in the failed working W path A-B back to the source network element 1.

Accordingly, using this method, suitable information can be exchanged in the K1 and K2 bytes to uniquely identify the setting up of the protection P paths for corresponding working W paths in a one to many subnetwork En configuration. It is recognized that other suitable overhead bytes of the overhead 204, 206 could be used in place of the K1/K2 bytes, given above by way of example only. It should be noted that the elapsed time, from failure detection by the SONET layer to the eventual configuration of the switch cards 35 in the selected protection P path, is preferably less than 200 msec based on the noted example subnetwork En of 200 network elements 14.

In the present shared protection signaling system, the exchange of K-byte values (x, y) by two network elements 7, 8 (see FIG. 5) may have no absolute confirmation guarantee that the respective K-byte (x, y) has been read by the adjacent corresponding network element 1, 2 before the next value (x, y) is sent. Therefore, it is assumed that the transmitted K-byte values (x, y) will be read in time for adequate protection switch processing. Therefore for those K-byte values (x, y) that are not read in time, a resend operation can be done in the event that the corresponding network element 14 does not receive a ACK or NACK. However, it is recognized that the re-send operation maybe performed with an inherent delay hence there may be no guarantee that the result of the re-send will still be within the desirable switching protection limit of less than 200 msec. In operation of the described K-byte value (x, y) submission protocol, as further described below, the corresponding network element 7, 8 sending the K-bytes (x, y) will send the same value (x, y) for a pre-determined number of msec. It can then take the corresponding network element 14 up to 0.375 msec, 3 frames for example, to validate the K-byte values (x, y) and generate an interrupt signal. The interrupt signal will cause the network element 14 to read the K-byte value (x, y) and put it on a cue for processing. The pre-defined validation time period will be set such that under heavy load conditions at the receiving network element 1, 2 the number of lost K-byte values (x, y) is less than 99.999%, or any other suitably acceptable tolerance for a particular subnetwork En architecture.

In the event that a K-byte value (x, y) does not get read in time and is overwritten in the STS-1 overhead 204, 206, care should be taken to provide that the overwritten K-byte value (x, y) is re-transmitted. However, when certain K-byte values (x, y) are lost then either the protection switch request message or the ACK/NACK could also be lost. Therefore, a possible result of either of these two cases is that the source network element 14 will not receive the ACK or the NACK. Accordingly, after sending the K-byte message request (x, y), the routing source network element 1, 6 can start a timer, whereby after the timer expires corresponding protection request can be put aside until all other protection switches of the corresponding protection P path(s) have been completed. At this time, the corresponding network element 1, 6 can re-try the previously failed protection switch. Further implementation is that after for example three failed attempts the source network element 1, 6 can give up the message requests and raise an alarm condition indicating the failure of the intended message request. It is recognized that a consequence of the failed protection switch request can be that a part of the protection P path(s) has been set-up from the termination network element 2 towards the routing source network element 1. Accordingly, since the complete protection P path is reserved for the protection switch, no misconnection can result. Therefore, if the network elements 1, 2, 3, 4, 5, 6, 7 can not set-up the desired protection P path, the source network element 1 will keep trying to release the protection P path to ensure there is no unclaimed protection P path connection(s) in existence.

Figure 6:
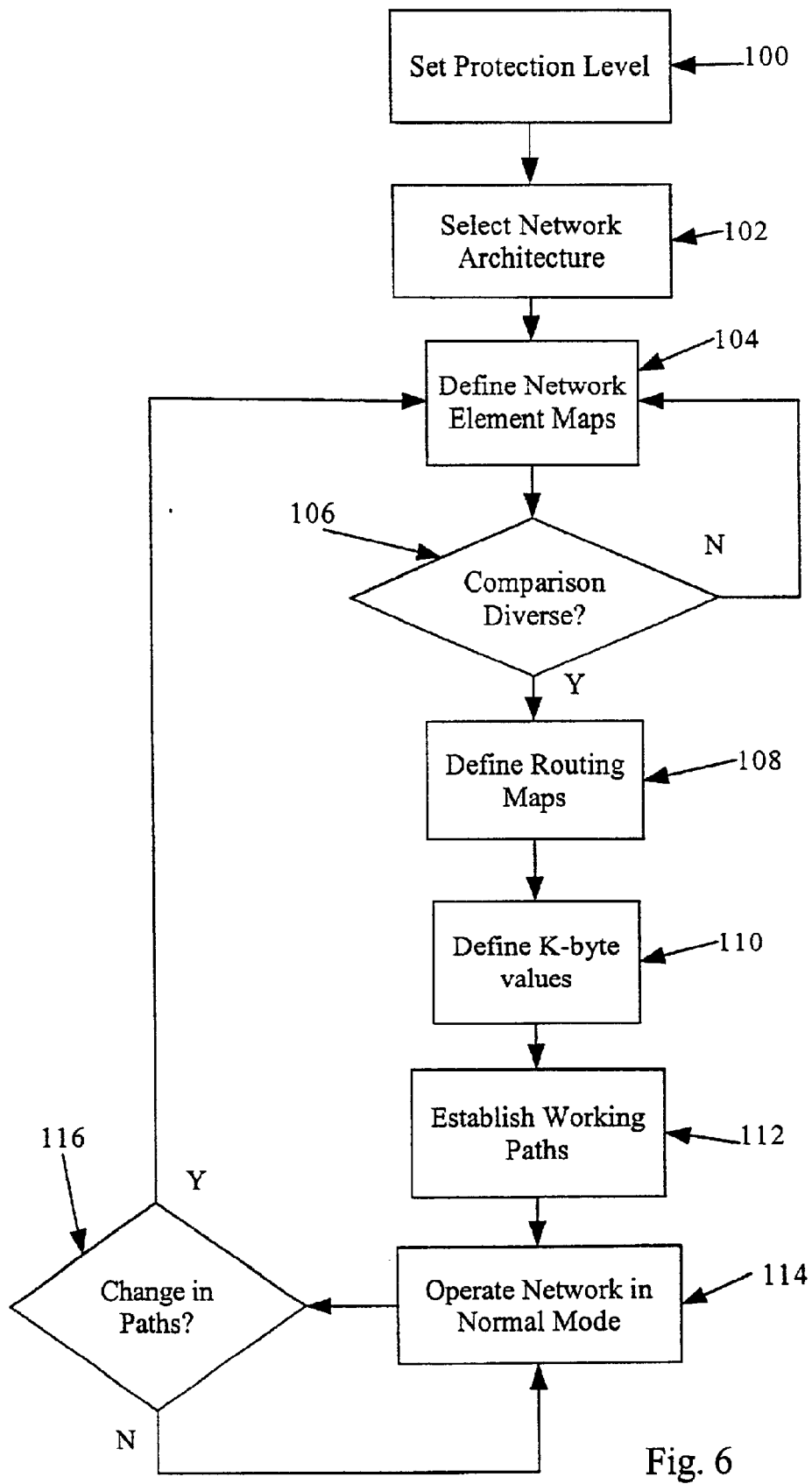

Referring to FIG. 6, the operation of the shared protection signaling system can be performed automatically through the use of software and/or associated hardware as will be described herein below.

At step 100, the required level of protection for each conduit 16 is determined by the management system 22, in response to connection requirements 24 received and/or anticipated from the clients 26. Next, the network 10 and sub-networks An, Bn Cn, Dn, En architecture, as depicted by example in FIGS. 1 and 2, is selected 102 from available network resources for network elements 14 and conduits 16 to be used for both the protection P and working W paths to satisfy the customer requirements 24. It is recognized that preferably the shortest paths are chosen as the working W paths and the next most optimal paths are chosen as the corresponding protection P paths in a 1:N relationship, subject to other considerations such as load capacity and cost.

At step 104, each controller OCCn 28 of the subnetwork En stores a corresponding map Mn of all network elements 1, 2, 3, 4, 5, 6 used in the path of each conduit 16. These maps Mn identify the particular working W paths and the network elements 14 they contain, as well as the related protection P paths and their contained network elements 14. In diverse environments, the nodal maps Mn corresponding to adjacent working W paths are compared 106 so as to check whether there is no overlap of working W or protection P paths contained in the network maps Mn. Accordingly, in the event of no overlap the working W paths specified can share the defined protection P path selected (i.e. 1:N protection scheme). On the contrary, if the interconnections between the network elements 1, 2, 3, 4, 5, 6 are not diverse then the protection P paths can be redefined until diversity is achieved.

Next, the routing map Rn information is defined 108 and stored at the network elements 14 with the data Rn that will be used in the event of protection path P initialization. The protection switching data of the map Rn includes the switching data that is inserted within the K1/K2 protection bytes of the overhead 204, 206 of the STS-1 frames 200 once a particular failure mode 34 occurs. The K-byte values (x, y) are transmitted in the opposite direction of where the failure 34 occurred, for eventual reception by the source network element 14. The Rn data defines conduit 16 modifications that are required to be performed within the switch card 35 of the network elements 14 included within the protection P paths, to implement the re-routing of failure affected data packets 20 represented by the STS-1 frames 200. The K byte values (x, y) are defined 110 in the routing maps Rn for use in the event the failure mode 34 is detected. Accordingly, the K1 byte is used to define the group number "x" and the K2 byte is used to define the protection group member "y". The function of the K byte value (x, y) is to direct the corresponding network elements 14 making up the protection P paths to cross connect the required ports 33 and time slot information, thus resulting in protection P path generation once a failure has occurred.

Next, the switch cards 35 of the network elements 14 concerned with the various defined working W paths are configured 112 to dictate where particular customer STS-1 frames 200 will be routed during normal operation of the subnetwork En. The combined effect of the switch card 35 configurations is the defining of the optical carrier conduits 16 and the network elements 14 that are to be used if STS-1 frame 200 is received during the working or normal mode of operation of the subnetwork En, on a particular port 33 within a path termination subnetwork element En. After definition and set-up of the working W paths, the network 10 operates in normal mode 114 until the failure 34 is detected, as detailed below. However, in the event the working W or protection P paths are modified prior to failure mode 34 in the subnetwork En, then the maps Mn, Rn are updated 116 as required.

Figure 7:
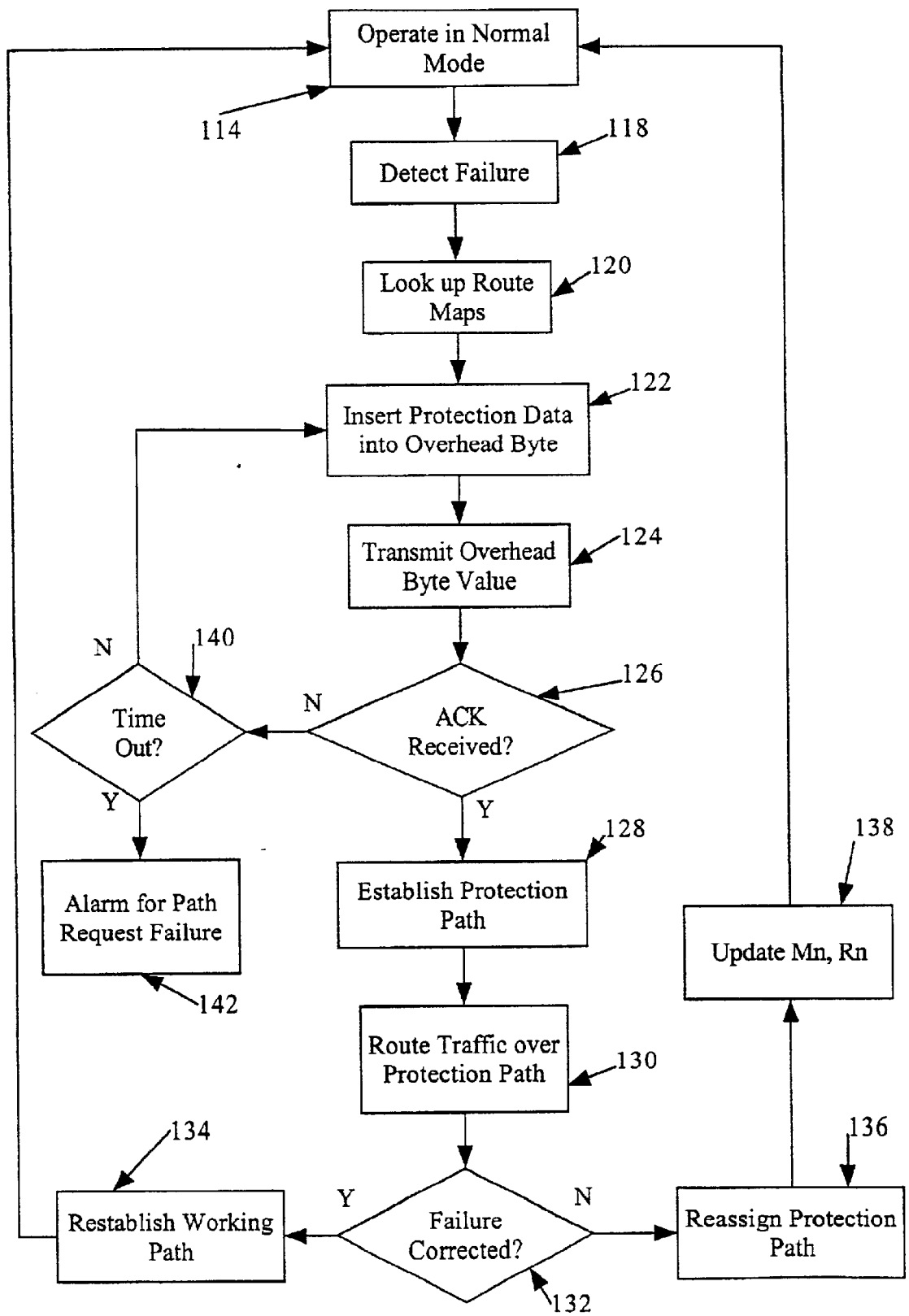

Referring to FIG. 7, the failure mode operation of the subnetwork En is described. From the normal mode of operation at step 114 of FIG. 6, the failure 34 is detected in the subnetwork En at step 118 by the network elements 14 adjacent to the failure 34. These adjacent network elements 14 look-up the protection entries within their corresponding routing tables Rn at step 120 and insert 122 the protection switching data of their entries into the corresponding K1/K2 byte values (x, y) of STS-1 frames 200 used for protection signaling purposes. Accordingly, the values (x, y) are directed 124 by the source network element 14 over the protection P path to the termination network element 14 to provide for setup of the protection P path. If the ACK is received by the source network element 14 from the termination network element 14 at step 126, then the defined protection P path contained in the maps Rn is established at step 128 by appropriate switch card 35 reconfiguration. Therefore, the STS-1 frames 200 of the data packets 20 originally meant for transmission on the original working W path are redirected 130 along the established protection P path containing the inserted protection K bytes K1, K2 until the original working W path is re-established 132, 134 through failure correction. However, in the event that the failure 34 is not corrected within a pre-determined time interval, the protection P path can become the new working W path step 136 and accordingly alternative protection P paths can be established by updating the maps Mn, Rn at step 138 accordingly. Subsequently, the subnetwork En can return to normal operation mode at step 114, which can be accomplished through use of the K1/K2 bytes to reestablish the original working W path in much the same way that the now outdated protection P path was established.

Conversely, if the ACK is not received at step 126, then the K bytes K1, K2 are resent until a timeout occurs 140 or the ACK is finally received, whichever is first. If the timeout at 140 is received, then the corresponding source network element 14 signals an alarm at 142 over the subnetwork En to the control layer 15 that the defined protection P path cannot be established. It is further recognized that an alternate $2^{nd}$ choice ($3^{rd}$ etc. . . . ) of protection P path could be contained within the maps Rn as part of the timeout procedure described above (i.e. as an alternative to the alarm signal transmission).

Accordingly, the present shared mesh protection signaling scheme of the present invention defines an associated protection P path when a working W path is established. During the protection P path definition, the corresponding protection P path information is sent down in the interrupt driven bytes of the overhead 204, 206 to the switch cards 35 of the network elements 14 making up the protection P path. Upon detection of the failure 34, the network elements 14 using the proprietary K-byte messages contained in the overhead 204, 206 will inform the routing source network element 14 of the conduit 16 of the failure 34 in the working W path. The routing network element 14 of the conduit 16 will then send the corresponding K-byte messages (x, y) down the protection P path to provide for protection P path establishment according to the preloaded data Rn located at the switch card 35. It should be noted that each conduit 16 can have a source and termination network element 14 which relates to the source network element 14 from where the corresponding conduit 16 was set-up, rather than the direction of the payload 202 transmission of the data packets 20. Accordingly, the tables Rn located at the switch card 35 of the network elements 14, set-up when the working W path connections A-B were initially established, determine this dynamically allocated protection P path environment. Therefore, based on the information contained in these tables Rn, the actual protection P path is established upon receiving the ACK from the termination network element 14 of the failed working W path transmitted along the now established protection P path.

In regard to the quality of path sizes in diverse routing applications, it is also possible to mix different sizes of the 1:N protection groups. For instance, a smaller one will fit in a larger one (many STS-1s into one OC48c). However, concatenated payloads can start at certain STS-1 boundaries, such as OC12c starts at STS-1, STS-13, etc. Accordingly, mixing of 1:N groups can also feature to optimize protection bandwidth by analysing on a link by link basis which protection groups can share protection bandwidth, through updating of the routing tables Rn stored at the network elements 14.

It should be noted that one working W path can have many protection groups, each with many members. For example link "1" between two network elements 14 can have three protection groups, with each five members. Link "2" between these two same network elements 14 can have another 2 protection groups with each 3 members, while link 3 between these same network elements 14 may not have any 1:N protection groups. The corresponding OCC 28 needs to keep track of the 1:N protection groups assigned at each link and the number of members in the protection groups. The OCC 28 must help to ensure that in a 1:N protection group there are never more than N members in the protection group. Furthermore, the value of N is defaulted for each working W path and can be changed through the suitable user interface 23 coupled to the integrated management system 22. The value of N is only valid for a particular link. For instance, N could be fixed to its default value or N can be changed, but only on a trunk (bundle of links between two nodes) basis.

It is recognized that conduits 16 having the same source and termination network elements 14 (for instance 1 and 2 in FIG. 5) can make use of a more optimized protection signaling scheme. For instance, if there are 23 STS1 1:N conduits 16 sourced at network element 1 and terminated at network element 2, and all are protected by network elements 1-3-4-2 (using 23 STS-1's), only 1 K-byte message (x, y) transmitted from network element 1 to network element 3 can suffice to indicate that all 23 STS-1 need be protection switched. This could require addition information at the corresponding network elements 14 to map the one message to the 2-3 connection requests.

Due to the provision of shared protection P paths, it is feasible that collisions for access to those paths P can occur. Referring to FIGS. 4a and c, one way to help misconnections and collisions is to send the protection switch request from the source network element 1 to the corresponding termination network element 2 to reserve the protection bandwidth, while the actual switch actions are done when receiving an acknowledgement (ACK) from the termination network element 2 and working its way back to the source network element 1. The acknowledgement should be associated with the protection switch request and should use the corresponding protection map tables Rn as well as send the correct K byte (x,y) values backwards. Accordingly, the protection map tables Rn should also be reserved for a reverse lookup. For instance, with a failure between the working W path A-B in FIG. 4a, network element 2 will send the acknowledgement (1,1) back to network element 4. Network element 4, then using its corresponding protection table R4 finds that this acknowledgement needs to be sent onto port P1 with a value of 1,1. It should be noted that this can be deduced by reading the first entry in the protection table R4 at network element 4 in the reverse order.

In reference to FIG. 5, after the link failure 34 has been detected, the source elements 1, 3, 6 will start routing K1 and K2 bytes to allocated protection P paths. The race to get access to the 1:N protection P paths can be considered unpredictable. For example, if both the working W paths A-B and C-D fail in a double failure mode, network element 1 will start the race for providing the protection P path to protect working W path A-B and network element 6 will do the same for working W path C-D. Somewhere between the network elements 3 and 4 a collision can be expected. Therefore, either the working W path A-B gets the protection P path between network elements 3-4 or working W path C-D is awarded the corresponding protection P path. Therefore, one of the protection P path network elements 3, 4 needs to back off with a Not Acknowledgement (NACK) sent back to the corresponding source network element 1, 6.

Furthermore, the above described collision circumstance also provides insight into a misconnection scenario. Accordingly, when network element 1 and network element 3 set-up the protection path to protect working path A-B, and network element 6 and network element 4 do the same for working path C-D, the collision can happen between network elements 3 and 4 and 1 will then be temporarily connected to network element until the collision gets resolved. Therefore, a forward reservation of the protection path can be provided for through forward reservation and activation of the switch request on receiving the acknowledgement sent in the reverse direction. This can have an impact on the switching times.

Accordingly, the content of the K byte message is in the form of (x,y). When the 1:N protection P paths are added to the sub-network En, the protection bandwidth should be reserved and a number can then be allocated to each 1:N group by the K bytes on each corresponding port 33 located between two adjacent network elements 14. Therefore, the K byte message format used in the present protection scheme can be (x,y) where x is the protection group number on the corresponding port 33 and y is the protection group member.

The shared mesh protection signaling scheme provides a 1:N protection, i.e. one protection path provides protection facilities for N working paths. Accordingly, the shared protection path scheme can provide for multiple diversely routed working paths A-B, C-D sharing a common protection path 3-4, (see FIG. 4a). This protection path can be an STS1 or any of the SONET/SDH combinations such as OC12, as long as the subnetwork En infrastructure supports these combinations. Further, one fibre of the conduit 16 can accommodate Dedicated Mesh (1+1), Shared Mesh (working and protection from different 1:N protection groups), Redial, Unprotected and Pre-emptable, all on the same fibre. This can help to provide optimised usage of available subnetwork En bandwidth.

The shared mesh protection signaling system can provide sharing of the data used during call set-up and data used for restoration once a failure is detected. Accordingly, connection data can be kept at the OCC line level 17 to provide 1:N connections, so as to help facilitate the set-up of diverse routes for all working W and protection paths P in the 1:N group for signaling between the OCCs 28. It is considered that the call set-up is not time critical in regard to fast protection switching. Furthermore, the restoration or routing data can be stored at the network elements 14 to provide 1:N protection switching. The routing data can be kept at the switch cards of the corresponding network elements 14 to provide signaling between corresponding network elements 14 with the signaling done using the STS-1 overhead 204, 206. It is noted that typically the respective hardware of network elements 14, such as the switch cards 35, have interrupt driven priority access to some of the overhead bytes, such as but not limited to the K1/K2 byte values, and can therefore dynamically act on the protection signaling information contained therein. It is considered that minimizing restoration time is critical in protection signaling systems.

Although the invention has been described with reference to certain specific embodiments, various modifications thereof will be apparent to those skilled in the art without departing from the spirit and scope of the invention as outlined in the claims appended hereto.

The embodiments of the invention in which an exclusive property or privilege is claimed are defined as follows:

1. In an optical mesh network, a controller for providing a 1:N shared mesh protection system to define a protection path associated with N working paths, the controller comprising:
   a) a first link for connecting the controller to a control layer of the network to monitor network traffic communicated in a path layer of the network;
   b) a second link for connecting the controller to the path layer of the network, the path layer including a plurality of interconnected network elements for providing the associated protection path and working paths;
   c) a connection table accessible by the controller, the connection table for having connection information of the network elements associated with the protection path and the working paths, the connection information including a first identity assignable to the protection path and a distinctive second identity assignable to each of the working paths; and
   d) a failure indicator for providing the first identity and the second identity relatable to a network failure of the corresponding working path to at least one of the network elements associated with the controller, the failure indicator for insertion into an interrupt driven overhead byte of the network traffic for communication between the network elements;

wherein the failure indicator is communicated in the overhead byte of the network traffic to provide for the establishment of the associated protection path after the network failure has been detected in the corresponding working path.

2. The controller according to claim 1, wherein the first identity is a group number uniquely identifying a defined protection group and the second identity is a member number uniquely identifying a defined member of the protection group.

3. The controller according to claim 2, wherein the group number defines the protection path and the member number defines a corresponding one of the working paths.

4. The controller according to claim 3 further comprising the failure indicator including a pair of overhead bytes.

5. The controller according to claim 4, wherein the first byte of the pair of overhead bytes has the group number and the second byte of the pair of overhead bytes has the member number.

6. The controller according to claim 5, wherein the first byte is selected from one of a K1-K2 byte pair and the second byte is selected from the other one of the K1-K2 byte pair.

7. The controller according to claim 3, wherein use of the overhead bytes for the failure indicator provides for a protection switching time of less than 200 msec.

8. The controller according to claim 2, wherein the failure indicator is used in a signaling message selected from the group comprising: a switch request, an acknowledgement of a switch request, a negative acknowledgement of a switch request, a revert back to working request, and an acknowledgement of a revert back to working request.

9. The controller according to claim 1 further associated with a routing table for storing the failure indicator, the routing table coupled to the network element associated with the controller.

10. The controller according to claim 9, wherein the routing table includes protection switching information corresponding to respective ports associated with the respective network element.

11. The controller according to claim 9, wherein the routing table is defined when the working paths are established in the network.

12. The controller according to claim 11, wherein the protection switching information contained in the routing table is supplied by the controller.

13. The controller according to claim 9 further associated with a source element of the network elements for coordinating the establishment of protection switches corresponding to the protection switching information contained in the routing table.

14. The controller according to claim 13, wherein the failure indicator is used by the source element for a signaling message selected from the group comprising: a switch request, an acknowledgement of a switch request, a negative acknowledgement of a switch request, a revert back to working request, and an acknowledgement of a revert back to working request.

15. The controller according to claim 9, wherein the first identity is a group number uniquely identifying a defined protection group and the second identity is a member number uniquely identifying a defined member of the protection group.

16. The controller according to claim 15, wherein the group number defines the protection path and the member number defines a corresponding one of the working paths.

17. The controller according to claim 16 further comprising the failure indicator including a pair of overhead bytes.

18. The controller according to claim 17, wherein the first byte of the pair of overhead bytes has the group number and the second byte of the pair of overhead bytes has the member number.

19. The controller according to claim 18, wherein the first byte is selected from one of a K1-K2 byte pair and the second byte is selected from the other one of the K1-K2 byte pair.

20. The controller according to claim 9, wherein the contents of the connection table are distributed in the network.

21. The controller according to claim 9, wherein the contents of the routing table are distributed in the network.

22. In an optical mesh network, a method for providing a 1:N shared mesh protection system to define a protection path associated with N working paths, the method comprising the steps of:
 a) interconnecting a plurality of network elements for providing the protection path and the working paths in a path layer of the network;
 b) monitoring by a control layer the network traffic communicated in the path layer;
 c) defining a connection table accessible by the control layer for containing connection information of the network elements associated with the protection path and working paths, the connection information including a first identity assigned to the protection path and a distinctive second identity assigned to each of the working paths;
 d) providing a failure indicator having the first identity and the second identity related to a detected network failure of the corresponding working path to at least one of the network elements; and
 e) inserting the failure indicator into an interrupt driven overhead byte of the network traffic for communication between the network elements;
wherein the failure indicator is communicated in the overhead byte of the network traffic to provide for the establishment of the associated protection path after the network failure has been detected in the corresponding working path.

23. The method according to claim 22, wherein the overhead byte location is selected from the group comprising: a line overhead and a path overhead of the network traffic.

24. The method according to claim 23 further comprising the step of storing in the failure indicator the first identity as a group number uniquely identifying a defined protection group and the second identity as a member number uniquely identifying a member of the protection group.

25. The method according to claim 24 further comprising the step of defining the group number as the protection path and the member number as a corresponding one of the working paths.

26. The method according to claim 25 further comprising the step of defining the failure indicator as a pair of overhead bytes.

27. The method according to claim 26 further comprising the step of defining the first byte of the pair of overhead bytes as the group number and the second byte of the pair of overhead bytes as the member number.

28. The method according to claim 27, wherein the first byte is selected from one of a K1–K2 byte pair and the second byte is selected from the other one of the K1–K2 byte pair.

29. The method according to claim 25, wherein use of the overhead bytes provides for a protection switching time of less than 200 msec.

30. The method according to claim 24 further comprising the step of selecting a first one of the working paths to become a first member of the protection group and selecting a second working path to become a second member of the same selected group.

31. The method according to claim 23 further comprising the step of employing the failure indicator in a signaling message selected from the group comprising: a switch request; an acknowledgement of a switch request; a negative acknowledgement of a switch request; a revert back to working request; and an acknowledgement of a revert back to working request.

32. The method according to claim 23 further comprising the step of providing a routing table for storing the failure indicator, the routing table coupled to at least one of the network elements.

33. The method according to claim 32 further comprising the step of storing protection switching information in the routing table corresponding to respective ports associated with the respective network element.

34. The method according to claim 32 further comprising the step of defining the routing table when the working paths are established in the network.

35. The method according to claim 34, wherein the protection switching information contained in the routing table is supplied by the control layer.

36. The method according to claim 35 further comprising the step of coordinating the establishment of protection switches corresponding to the protection switching information contained in the routing table.

37. The method according to claim 32 further comprising the step of storing in the failure indicator the first identity as a group number uniquely identifying a defined protection group and the second identity as a member number uniquely identifying a member of the protection group.

38. The method according to claim 37 further comprising the step of defining the group number as the protection path and the member number as a corresponding one of the working paths.

39. The method according to claim 38 further comprising the step of defining the failure indicator as a pair of overhead bytes.

40. The method according to claim 39, wherein the first byte is selected from one of a K1–K2 byte pair and the second byte is selected from the other one of the K1–K2 byte pair.

41. The method according to claim 37, wherein the selection of the first and second working paths is associated with the step of defining of the connection table.

42. The method according to claim 32 further comprising the step of configuring a protection switch corresponding to the protection switching information included in the network elements.

43. The method according to claim 32 further comprising the step of detecting the network failure.

44. The method according to claim 43 further comprising the step of accessing the routing table and inserting the failure indicator into the overhead byte for transmission over the network.

45. The method according to claim 44 further comprising the step of receiving an acknowledgement pertaining to the overhead byte message for indicating the suitability of the protection path.

46. The method according to claim 45 further comprising the step of establishing the protection path for subsequent routing of the network traffic over the protection path.

47. The method according to claim 45 further comprising the step of submitting an alarm indicating a message failure of a protection path request in the event of a time out.

48. The method according to claim 45 further comprising the step of selecting an alternate protection path in the event of not receiving an acknowledgement of the transmitted overhead byte transmission.

49. In an optical mesh network, a computer program product for providing a 1:N shared mesh protection system to define a protection path associated with N working paths, the product comprising:
   a) computer readable medium;
   b) a first link module stored on the computer readable medium for connecting a controller to a control layer of the network to monitor network traffic communicated in a path layer of the network;
   c) a second link module coupled to the first link layer module for connecting the controller to the path layer of the network, the path layer including a plurality of interconnected network elements for providing the associated protection path and working paths;
   d) a connection table module coupled to the first link module accessible by the controller, the connection table module for having connection information of the network elements associated with the protection path and the working paths, the connection information including a first identity assignable to the protection path and a distinctive second identity assignable to each of the working paths; and
   e) a failure indicator module coupled to the connection table module for providing the first identity and the second identity relatable to a network failure of the corresponding working path to at least one of the network elements associated with the controller, the failure indicator module for inserting a failure message into an interrupt driven overhead byte of the network traffic for communication between the network elements;

wherein the failure message is communicated in the overhead byte of the network traffic to provide for the establishment of the associated protection path after the network failure has been detected in the corresponding working path.

50. A network element for providing an indication of a network failure in an optical mesh network, the network having a 1:N shared mesh protection system to define a protection path associated with N working paths, the network element comprising:
   a) a link for connecting the network element to a path layer of the network, the path layer including a plurality of interconnected elements for providing the associated protection path and working paths;
   b) a routing table accessible by the network element, the routing table having routing information associated with the protection path and the working path;
   c) a first identity assignable to the protection path and a distinctive second identity assignable to each of the working paths, the identities associated with the routing information; and
   d) a failure indicator for providing the first identity and the second identity relatable to a network failure of the corresponding working path to at least one of the interconnected elements, the failure indicator for insertion into an interrupt driven overhead byte of network traffic transmitted over the mesh network for communication between the interconnected elements;

wherein the failure indicator is communicated in the overhead byte of the network traffic to help initiate the establishment of the associated protection path after the network failure has been detected in the corresponding working path.

* * * * *